United States Patent Office 3,809,592
Patented May 7, 1974

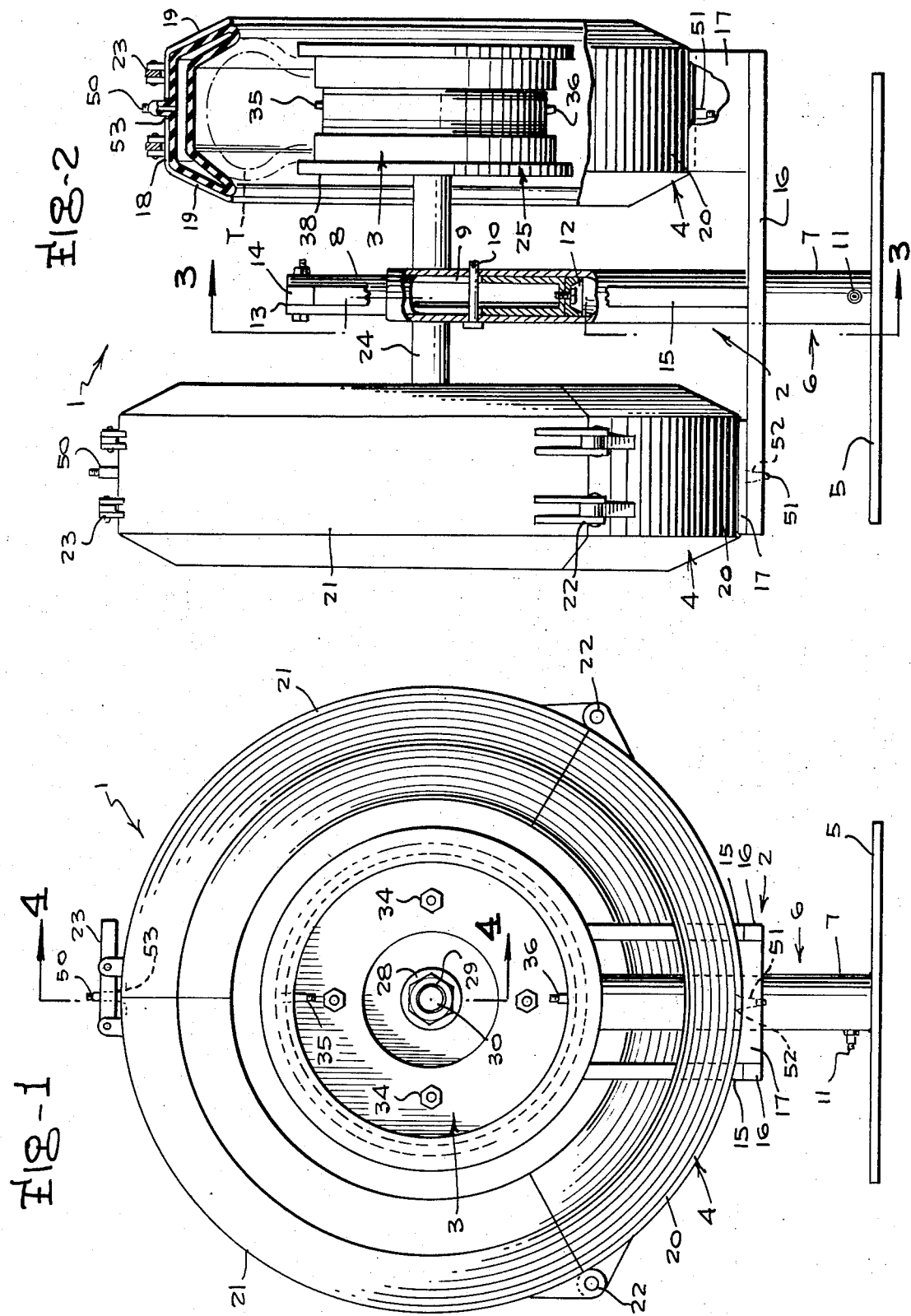

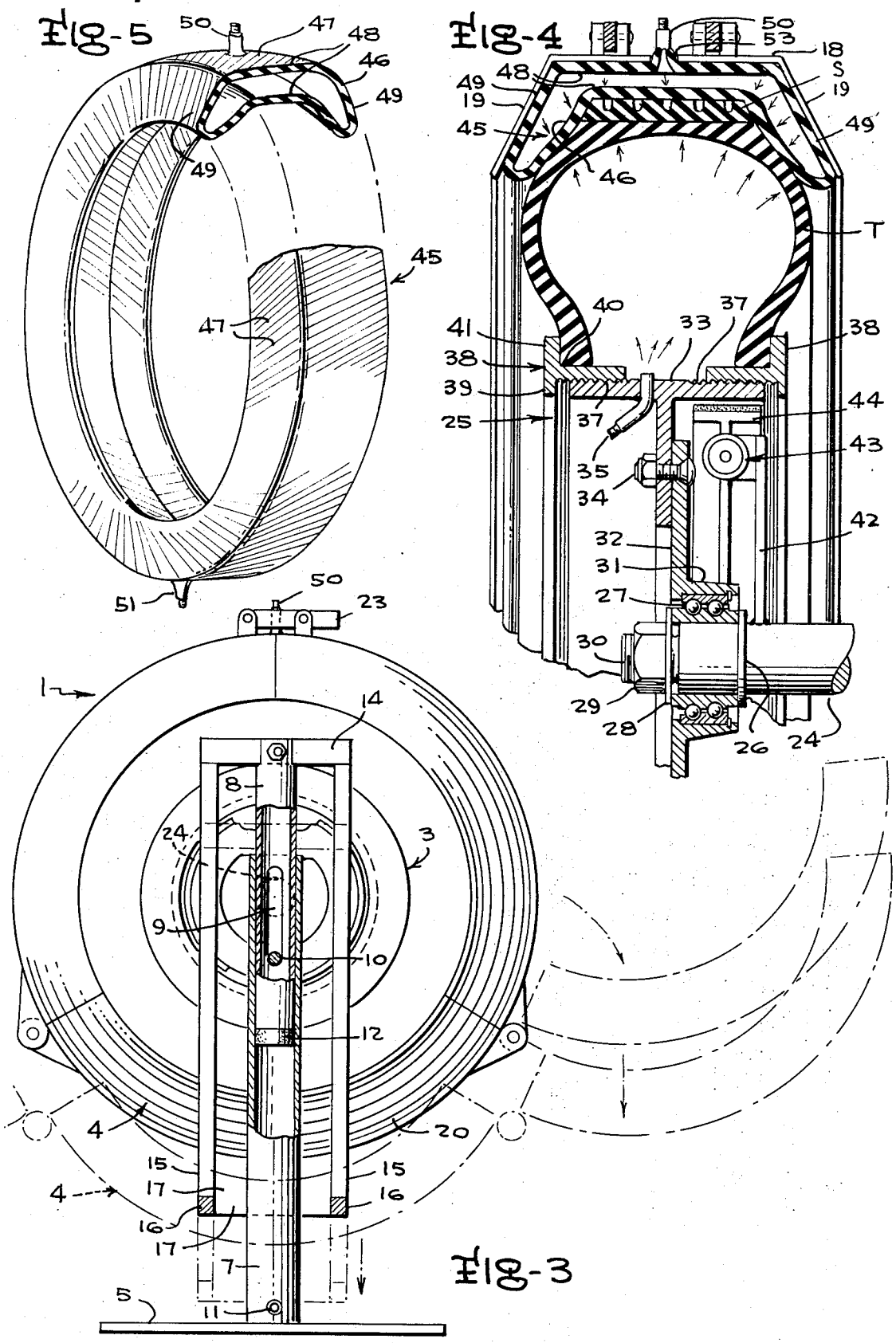

3,809,592
PROCESS AND APPARATUS FOR RETREADING TIRES
Clement O. Dennis and William Franklin Everhardt, Macon, Ga., assignors to Denbilt Corporation, Macon, Ga.
Filed Apr. 4, 1972, Ser. No. 240,948
Int. Cl. B29h 5/04
U.S. Cl. 156—394                                    13 Claims

ABSTRACT OF THE DISCLOSURE

A process and apparatus for retreading tires wherein a tire casing with an applied tread rubber strip is mounted on a rim and encircled with a hollow, inflatable, flexible matrix or curing bag within a rigid housing shell, and heated fluid under pressure is run simultaneously through the interior of the tire casing and through the hollow, flexible matrix bag to apply curing heat and pressure to both the exposed surfaces of the tread strip and the interior of the tire on opposite sides of the bond interface. The apparatus embodies a rotatable rim to mount the tire, with brake means to hold it immovable. The shell which houses or backs-up the flexible matrix or curing bag is of hinged, sectional construction, and means are provided for raising and lowering the open shell to facilitate loading tires on the rim. The generally self-supporting annular flexible matrix or curing bag is molded or formed with a generally hollow, channel-like cross-sectional shape providing a generally flat central inner wall section relatively closely approximating the width of the tread strip cross-section for contact with the tread surface of the strip, and further providing integrally molded annular transversely extending side and adjacent side wall portions of the tire casing.

BACKGROUND OF THE INVENTION

This invention relates to a process for retreading tires and to improve tire retreading apparatus for carrying out the process.

The most common previous practice in tire retreading is to buff a tire to be retreaded, to remove the old tread rubber and provide a smooth surface for the new rubber, and then wrap a strip of uncured tread rubber about the buffed surface. The tire casing, with its applied tread strip, is then mounted in a retreading matrix by means of a loading and unloading press. These presses are quite large and fairly complex machines, and are very expensive, both to buy and to maintain. After loading, the matrix with the tire in place is moved on a dolly from the loading press to a curing station, where the matrix is connected to a source of power for heating, and the tire casing is connected to a source of fluid under pressure to inflate it, and hold it inflated during curing. After the curing period is completed, the matrix is removed from the curing station and transported back to the press where the re-retreaded tire is removed.

The matrices used in the present day method are aluminum and made to precise size. In addition, the matrix contains the tread pattern on its inner surafce. Under these conditions, a change in tread pattern requires a change of matrix, and separate matrices are needed for each tire size. Because the tire tread pattern is in the matrix, the tire with its applied retread strip has to be reduced in diameter in order to insert it into the matrix. After insertion, the tread rubber has to be pressed into the matrix to imprint the tread design. This is done by inflating the tire to press the retread rubber into the matrix design.

In a known prior art system, the pressure required for curing the retread rubber and for bonding the rubber to the casing is applied through the casing by inflation of the casing to press the tread strip against the matrix. The heat required for the process, however, is applied solely through the martix. The matrix is heated electrically, and the heat must travel by conduction from the matrix to the tread strip, and from the tread strip to the casing. This is slow, and the heat is not always uniformly distributed through the tread strip and casing. This results in imperfect bonding, with frequent separation of the strip from the casing in use.

SUMMARY OF THE INVENTION

The general object of the invention is to provide an improved process and apparatus for retreading tires which will result in better bonding between retread rubber strip and casing, a much shorter retreading cycle and considerable saving in original set up and in operation costs.

A more specific object of the invention is to provide an improved process and apparatus for retreading tires which apply heat and pressure upon both the tread strip side of the tire and tread strip assembly and to the interior of the tire casing, so that heat and pressure are applied from opposite sides toward the line of jointure for a quicker retreading cycle and a more perfect bond between the tire and the tread strip.

Another object is to provide a process and apparatus by which heat and pressure are applied completely around the tread strip for more uniform bonding of the strip to the tire casing.

A further object is the provision of a process and apparatus which applies heat and pressure to the exposed surfaces of the tread strip by flexible means, whereby the applying means may adapt itself to the size and contour of the surface to be treated.

It is also an object to provide such process and apparatus which will permit retreading tires of different sizes without substitution of parts to adapt to the different dimensions.

Yet another object is the provision of apparatus which will accomodate tires of different size, and has means to center the tire relative to the outer, flexible, pressure and heat applying means, so that uniform heat and pressure application may be obtained with tires of different sizes.

A still further object of the invention is to provide tire retreading apparatus which has an openable outer shell to receive and encompass a mounted tire, tread strip and surrounding flexible heat and pressure applying member which is a matrix-like curing bag, and means to support the assembly in properly centered relation during curing of the tread strip and bonding to the tire.

Other objects of the invention will become apparent from the following description of one practical embodiment thereof, when taken in conjunction with the drawings which accompany, and form part of, this specification.

BRIEF DESCRIPTION OF THE DRAWINGS

FIG. 1 is an end elevational view of tire retreading apparatus embodying the principles of the present invention;

FIG. 2 is a side view of the apparatus shown in FIG. 1;

FIG. 3 is a vertical section taken on the line 3—3 of FIG. 2 showing the means for raising and lowering the tire housing member relative to the mounted tire;

FIG. 4 is an enlarged section taken on the line 4—4 of FIG. 1, illustrating a tire in section in place in the retreading assembly; and FIG. 5 is a perspective view of a flexible matrix-like curing bag having a molded, hollow, generally channel like cross-section which is self-supporting, and which matrix bag encompasses the outer surface of the tire and tread strip assembly.

DESCRIPTION OF THE PREFERRED EMBODIMENT

Before describing in detail the tire retreading apparatus shown in the drawings, the new retreading process which the apparatus performs will be described first.

In carrying out the process, a properly buffed tire casing has its outer, circumferential surface covered with a strip of retread rubber in the usual manner. With the new process this strip can be either cured or uncured rubber, as desired. Normally, the outer surface of the strip will be preformed to the desired tread pattern. The inner side of the tire, that is the normally open side across the tire beads, is sealed off so that the tire may be inflated later in the process. An annular, flexible inflatable bag-like member is then placed over the tread rubber side of the tire and tread strip assembly so that it may be brought into bearing contact with the entire tread strip, including the outer surface and the edge surfaces also. Heat and pressure are then applied both to the inside of the tire and against the flexible means, to force the tread strip tightly against the tire surface and to heat both the tread strip and tire. The heat and the pressure are continued for the proper time to cure the tread rubber, if uncured rubber is used, and to cause the tread rubber to securely bond to the tire.

Due to the fact that heat and pressure are applied to the tread strip by a flexible member, tires of various sizes and cross-sectional shapes can be retreaded, for the flexible member will conform to the surface contour against which it is forced. Also, the contact will be with all exposed surfaces of the strip for more complete and uniform pressure and heat application. By applying heat simultaneously to both the outer tread surfaces and the inside of the tire, heat travels inwardly toward the interface to be bonded, resulting in far more uniformity of heat application to tread strip and tire alike, and a more perfect bond between the two. It is apparent that the application of heat simultaneously to the outer and inner surfaces will enable much quicker curing and bonding than is possible with the process previously used. Tests have shown that the bond formed by this process is much more difficult to rupture than that made by the conventional method with heat applied only by the metal matrix.

Turning now to the drawings, there is shown apparatus 1 for loading tires for retreading by the above-described process, for supporting them during the curing cycle, and for unloading the tires after retreading is completed. Referring to the drawings in detail, the apparatus includes a stand 2, tire mounting, lifting and supporting means 3, and one or more shells 4 to house the flexible heat and pressure applying member mentioned above, during the curing cycle of the retreading process.

The stand 2 has a base 5 upon which a vertical post 6 is mounted. The post is in two sections, a bottom section 7 fixed to the base, and a top section 8 telescopically slidable within the bottom section. The top section is vertically slotted on opposite sides near its bottom, as at 9, and a pin 10 through the bottom section and slots 9 holds the top section against rotative movement relative to the bottom section. The bottom section serves as a cylinder, and has a hose connection 11 to which a source of fluid under pressure may be connected. A piston cup 12 is attached to the bottom of the top section 8 so that the section forms a piston and when pressurized fluid is introduced into the bottom section 7 the upper section will rise.

The top section 8, or the piston section of the supporting post 6, is notched in its upper edge, as at 13, to receive a horizontal bridge bar 14, that is fixed to the piston section to move with it. The ends of the bridge bar, on opposite sides of the supporting post, have depending lifting rods 15 attached to them, the rods extending parallel to one another and to the supporting post 6. At their bottoms, the support rods are connected to horizontal support arms 16 projecting equal distances on opposite sides of the support post. Support blocks 17 are seated on the ends of arms 16 to mount the shells 4.

With the above-described telescoping support post and shell-supporting structure carried thereby, the shells 4 can be raised and lowered as required by admitting pressurized fluid to, or releasing it from, the lower cylinder section 7 of the post 6. This will permit proper height positioning of the shells for loading tires in the apparatus, curing them, and unloading them after curing.

Each shell is an annular housing member of inwardly opening, generally U-shaped cross-section. It has a circular outer wall 18 with inwardly diverging side walls 19 extending from the sides of the outer wall. Thus, a trough-shaped retaining shell is formed to hold the flexible matrix and to serve as a fixed abutment for that member when the inflatable bag-like member or matrix is inflated, as will be described. For convenience in loading and unloading tires, the shell is divided into three hinged sections. The center section 20 is fixed to the support block 17, with its ends equidistant from the block centerline, and the end sections 21 are connected by hinges 22 to the ends of the center section, so that the end sections can be swung outwardly for loading and unloading. A conventional fastener 23 has its elements attached to the free ends of the end sections to permit locking the shell sections in closed position.

Tires to be retreaded are loaded onto, and supported during curing upon the supporting unit 3. This unit includes the fixed, bottom member of the support post 6, stub shafts 24 connected to the post, and tire-mounting rims 25 rotatably carried by the shafts. As both assemblies are identical, only one will be described. Shaft 24 has a flange 26 spaced inwardly from its outer end, which serves as a retainer for an anti-friction bearing assembly 27. The bearing is slipped onto the outer end of the shaft against the flange. It is held in position by a washer 28 and a nut 29 threaded on the reduced threaded end 30 of the shaft. A hub member 31 having an upstanding flange 32 is mounted on bearing 27 and, of course, is rotatable on the shaft. Tire-mounting rim 25 is a flat, circular member having a central, depending, annular mounting plate 33 overlying the hub flange 32. The flange and mounting plate have matching openings to receive bolts 34 to secure the rim to the hub for rotation with it. A fluid fitting 35 opens through the rim at one side to permit entry of heated fluid under pressure to the interior of a tire mounted on the rim, and a second fluid fitting 36 opens through the rim diametrically opposed to the fitting 35 to provide a fluid discharge from the tire.

In order to permit mounting tires on the rim and removing them, and, at the same time, make provision for centering tires of different size widthwise of the rim, the rim is threaded inwardly from each edge, as at 37, and threaded, bead-retaining flanges 38 are screwed onto the threaded areas 37. These flanges have depending skirts 39 that contact the rim edges and determine inner limits for the flanges. When larger tires are mounted, the two flanges will be adjusted to center the tire with respect to the rim, and also with respect to shell 4. Each flange 38 has a bead seat 40 and an upstanding bead retainer 41.

Although it is desired to have the rim rotatable for ease in mounting and demounting tires, it is necessary that the rim be stationary during the curing cycle. Therefore, a mounting plate 42 is fixed to the stub shaft, and suitable brake mechanism 43, having brake shoes 44 for braking contact with the underside of rim 25, is mounted on the plate. The brake can be either a normally-on type to be released during tire mounting, or a normally-off type to be applied during the curing cycle. As the brake can be of any suitable, conventional construction, no details of the brake structure have been shown.

A flexible heat and pressure applying member or element 45 completes the apparatus required to retread a tire. This is shown as an inflatable bag of annular shape, which, when inflated, will encompass the outer surfaces of the tire and tread rubber assembly, and be in bearing contact with all the exposed surfaces of the tread strip as well as with adjacent side wall portion of the tire casing. It has been found that very satisfactory results are obtained with a curing bag, or flexible matrix, having somewhat the cross-sectional shape of the assembly to which it is to conform. To this end, a rubber tubular member may be wrapped circumferentially of its tubular cross-section to provide a fabric reinforcement which will strengthen the tube without materially reducing its flexibility, as do longitudinal or bias laid reinforcing cords. In FIGS. 4 and 5, the base rubber tube is shown at 46 and the reinforcing cord at 47. After the tube has been reinforced, it is put into a mold and cured so as to have the generally self-supporting channel-like cross-section. The mold will form a central tread-strip contacting section 48 having generally parallel top and bottom walls, and integrally formed relatively rigid side pressure flaps 49 which extend transversely therefrom divergingly inward of the unit and taper from the central section toward their edges. The flexibile curing bag or matrix has a fluid inlet fitting 50 externally at its top, and an outlet fitting 51 at its bottom. When the curing bag/matrix is in place in the apparatus, the fitting 51 will extend through an opening 52 in the bottom of shell 4 and supporting block 17, and fitting 50 will project through an opening 53 formed by the meeting edges of the shell end sections 21.

In carrying out the method with the described apparatus, fastening element 23 of the shell will be released, and the end sections 21 swung outwardly about their hinge connections 22 with the central section 20. Fluid will be released from the bottom cylinder member 7 of the support post 6, to allow the post top section 8 with the shell-supporting structure to move downwardly. This will leave the tire mounting rim 25 entirely open and unencumbered to receive a tire. The outermost tire flange 38 will be removed from rim 25, so that a tire with its applied rubber tread strip may be slipped on the rim. Brake 43 will be released to facilitate tire mounting. One tire bead will be slipped upon bead seat 40 of the rear flange 38, and the outermost flange will be re-threaded on the rim with the other tire bead being seated upon its bead seat. If the tire T being mounted is larger than the minimum size for which the unit is designed, the two flanges 38 will be adjusted to center the tire width-wise of the rim, and, at the same time, into proper position with respect to the shell. After the tire T is mounted, the flexible curing bag or matrix will be put over the assembly in an initially uninflated condition with the central portion 48 over the tread strip S, and the side pressure flaps overlying the strip side edges, substantially in the position shown in FIG. 4. To facilitate the installation of the flexible bag/matrix 45 about the tire T with its applied, pre-grooved rubber strip S, a conventional liquid lubricant may be sprayed on the surface of the tire T and the grooved portion of the strip S, so that the flexible curing bag will more readily slide over the tire assembly. The outer fitting 51 should be located at the assembly bottom, so that it will enter opening 52 when the shell is raised. This will automatically position the inlet fitting 50. The shell may now be raised by introducing pressurized fluid into the support post cylinder 7. The shell will be raised until the end sections can be brought together and locked. After the shell is locked, the pressure in cylinder 7 can be released so that the shell can float to automatically assume its proper position when the tire and the flexible curing bag are inflated.

When the tire T is in position and the shell locked, the inlet and outlet fittings 35 and 36 of the rim and 50 and 51 of the flexible curing bag/matrix 45 are connected to sources of heated and pressurized fluid, usually air, and to return lines respectively. The tire T and the flexible curing bag/matrix 45 will be inflated to predetermined pressure and maintained at that pressure by continuous flow of the heated fluid. Shell 4 will act as an abutment member for the flexible curing bag/matrix so that the latter's pressure will be directed toward the tread strip S. Thus, both heat and pressure will be directed toward the bond line between the tire T and tread strip S from both inside the tire and from the tread strip surface, resulting in uniform and rapid heat transfer to the bond interface, and to the rubber to be cured if uncured rubber is used.

Additionally any liquid lubricant which remains in the grooves of the strip S, after it was sprayed on, evaporates or vaporizes due to the heat applied during the curing cycle creates a higher pressure as a result of its expansion during change from liquid to gaseous state. This, and the heating of the air trapped in the grooves of strip S produce additional pressure during the curing cycle, assuring a high bonding pressure in the zone of the grooves.

After the curing cycle is completed, the flow of heated pressure fluid to the interior of the tire and the flexible curing bag/matrix is cut off. The shell fastening is released and the shell opened and lowered. When the flexible curing bag/matrix has been removed from the retreaded tire, the tire is removed by unscrewing the front flange 38 from the rim and slipping the tire off of the rim. The apparatus is then ready to receive another tire casing and tread strip assembly.

As the flexible curing bag/matrix will adapt to a limited range of tires of various sizes, and the rim has both flanges threadedly mounted to allow for centering different size tires relative to the rim and the shell, it is not necessary to have apparatus specifically designed for a particular tire size, but tires with a relatively broad range of sizes may be cured with one rim and matrix. It is more practical, however, to provide apparatus in several sizes capable of handling tires in different size ranges. Therefore, the apparatus is shown with units of different size, one on one side and a different size on the other side. Of course, when quantity curing in one size range is being done, both units can be the same.

The new process and the disclosed apparatus not only provide faster, more uniform heating and a more perfect bond between the tire casing and the tread rubber, but the equipment is much less expensive than that now being used and requires only loading and unloading without transferring to a separate curing center. This greatly reduces operational costs. At the same time, the equipment is much less complex than that previously used and, consequently, can be made for a much cheaper price. As the loading, curing and unloading require a far shorter period than with present equipment, fewer units will be needed to retread a given number of tires in a predetermined period, thus reducing installation costs for quantity production.

While in the above one practical embodiment of the invention has been disclosed, it will be apparent that the specific details of the apparatus shown are merely by way of example, and the invention may take other forms within the scope of the appended claims.

What is claimed is:

1. Apparatus for retreading tires comprising in combination,
    (a) a supporting rim upon which a tire casing with a strip of retread rubber about its outer periphery may be mounted;
    (b) means for heating said tire casing and tread strip including means to admit fluid under pressure through said rim to the interior of a tire casing mounted on said rim;
    (c) said means for heating said tire casing and tread strip including a flexible annular curing bag/matrix to outwardly peripherally encompass said tire and tread strip and through which to circulate a heated fluid; said curing bag/matrix fabricated to have a molded generally channel-like cross-sectional shape with said flap portions overlaying portions of said tire casing side walls adjacent to said retread strip of rubber, and including means to admit heated fluid under pressure to said flexible curing bag/matrix to inflate and tightly hold said flexible curing bag/matrix in predetermined pressure, heat-transferring contact with said tread strip with the aid of a housing shell means;

(d) housing shell means including a rigid annular wall radially spaced from and around said tire casing for rigidly backing said flexible curing bag/matrix, said housing shell being composed of hinged sections to allow opening for loading and unloading tires on the rim; and (e) a base supporting the rim and housing shell, and means on the base to raise and lower the housing shell relative to the rim.

2. Apparatus for retreading tires as claimed in claim 1, wherein the flexible matrix is a closed and continuous tubular member of annular form, and the means to admit heated fluid under pressure to said matrix include a pair of fluid inlet and outlet passages openingly communicating with the interior of said tubular member.

3. Apparatus for retreading tires as claimed in claim 2, further including a shaft mounted on said base, and means rotatably mounting the rim on said shaft.

4. Apparatus for retreading tires as claims in claim 1, wherein the rim comprises a base annular member and tire bead retaining members around opposite edges of the base annular member, one of the tire bead retaining members being removably connected to the base annular member to facilitate loading and unloading tires.

5. Apparatus for retreading tires as claimed in claim 3 wherein, both tire bead retaining members are removable from the base annular member, and there are cooperating means on the base annular member and the tire bead retaining members premitting adjustable positioning of the tire bead retaining members equidistant widthwise on opposite sides of the base annular member centerline to center tires relative to the rim.

6. Apparatus for retreading tires as claimed in claim 4 wherein, their is braking means fixed to the shaft and operable against the rim to hold the rim against rotation on the shaft.

7. Apparatus for retreading tires as claimed in claim 1 wherein, said flexible curing bag/matrix is an endless tubular member whose premolded generally channel-like cross-section is of relatively rigid form having a relatively straight center section corresponding essentially to the width of said tread strip and whose side flaps abut the side edges of the tread strip and the adjacent side wall portions of said tire casing to preclude lateral shifting of the tread strip; and the means to admit heated fluid under pressure to the curing bag/matrix is open to the interior of the tubular member.

8. Apparatus for retreading tires as claimed in claim 1 wherein, the means of paragraph (b) are capable of admitting heated fluid under pressure to the interior of said tire casing, and further including means open through said rim to allow discharge of heated fluid therefrom, whereby heated fluid may be continuously admitted to and discharged from the flexible curing bag/matrix and the interior of a tire mounted on the rim.

9. Apparatus for retreading tires as claimed in claim 7, wherein said tubular flexible curing bag/matrix has a relatively straight tread-strip-contacting central cross-section with generally parallel spaced outer and inner walls with opposite side edges which cooperatively form transverse annular pressure flaps depending from the sides of said center section, and said central cross-section's inner wall having a predetermined width corresponding generally to and for essentially flush contact with the width of the retread strip.

10. Apparatus for retreading tires as claimed in claim 9 wherein, said annular pressure flaps each tapers inwardly from its joinder with the central section, and the opposed pressure flaps diverge downwardly from the central section.

11. A fluid-pressure-inflatable endless flexible curing bag/matrix for use in retreading a tire casing which has a retread strip applied about its previously prepared outer periphery, and which endless bag/matrix envelopes the outer periphery of said casing and applied strip, and is used in association with apparatus having complemental annular rigid wall means disposed in radially spaced relation from a mounted tire casing and outwardly adjacent said flexible curing bag/matrix, said curing bag/matrix comprising (a) a hollow annular member fabricated of a flexible material to overlay and encompass the outer periphery of a tire casing and its applied tread strip;

(b) said annular member having a molded or preformed generally channel-like cross-section of relatively rigid character, said channel-like cross-section including a relatively straight central portion with generally parallel spaced radially inner and outer walls having opposite side edges which cooperatively integrally form transverse annular pressure flaps having closed marginal edges;

(c) said pressure flaps depending radially inwardly from the sides of said central portion;

(d) said central portion's inner wall having a predetermined width corresponding generally to the width of and for essentially flush contact against the retread strip; and (e) fluid inlet and outlet fitting means on the hollow annular member for ingress and egress of a circulating fluid for selectively pressurizing said hollow annular member during retreading operations, with said side flaps firmly overlaying lateral opposite side edges of the retread strip so as to preclude lateral shifting movements thereof during the retreading operation.

12. A curing bag/matrix as claimed in claim 10, wherein said pressure flaps are communicatively connected with said central portion, and each extend transversely from the central portion in a diverging manner so as to both overlay portions of the tire casing side wall and lateral opposite side edges of the retread strip so as to firmly hold the retread strip sides in contact with the casing while precluding lateral shifting movement of the retread strip during the retreading operation.

13. A curing bag/matrix as claimed in claim 10, wherein the flexible material is composed of rubber-like material with reinforcing cords laid circumferentially of its cross-section.

References Cited

UNITED STATES PATENTS

| 2,686,554 | 8/1954 | Hinman | 156—127 |
|---|---|---|---|
| 2,501,577 | 3/1950 | Pfeiffer | 156—394 FM |
| 2,468,121 | 4/1949 | Shell | 156—394 FM |
| 2,872,704 | 2/1959 | Shaevitz | 156—127 |
| 1,483,857 | 2/1924 | Fitzharris | 156—394 FM |
| Re. 15,120 | 6/1921 | Pfeiffer | 425—40 |
| 2,904,842 | 9/1959 | Alm | 156—394 |
| 3,042,966 | 7/1962 | Laycox | 425—23 |
| 3,429,005 | 2/1969 | MacMillan | 425—38 |

FOREIGN PATENTS

| 634,953 | 1/1962 | Canada | 156—394 |
|---|---|---|---|
| 555,680 | 9/1943 | Great Britain | 156—96 |
| 555,689 | 9/1943 | Great Britain | 156—96 |
| 555,690 | 9/1943 | Great Britain | 156—96 |

CLIFTON B. COSBY, Primary Examiner

U.S. Cl. X.R.

159—96, 123, 127, 128, 130; 425—23, 38, 40

UNITED STATES PATENT OFFICE
CERTIFICATE OF CORRECTION

Patent No. 3,809,592    Dated May 7, 1974

Inventor(s) C.O. Dennis et al

It is certified that error appears in the above-identified patent and that said Letters Patent are hereby corrected as shown below:

In the title on the drawing sheets and in Column 1, "PROCESS AND" should be deleted.

In the Claims, Column 7, line 27, "2" should read --1--; line 36, "3" should read --4--; line 44, "4" should read --5--; Column 8, line 40, "10" should read --11--; line 49, "10" should read --11--.

Signed and sealed this 29th day of October 1974.

(SEAL)
Attest:

McCOY M. GIBSON JR.
Attesting Officer

C. MARSHALL DANN
Commissioner of Patents